US008934867B2

(12) United States Patent
Shanmugavadivel et al.

(10) Patent No.: US 8,934,867 B2
(45) Date of Patent: Jan. 13, 2015

(54) ON-DEMAND ACCESS TUNNEL BETWEEN SERVICE PROVIDER NETWORK AND WIRELESS COMMUNICATION NETWORK

(75) Inventors: Senthilraj Shanmugavadivel, Coimbatore (IN); Anil Kaushik, Bangalore (IN); Raj Kiran, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 316 days.

(21) Appl. No.: 13/545,165

(22) Filed: Jul. 10, 2012

(65) Prior Publication Data

US 2014/0018037 A1 Jan. 16, 2014

(51) Int. Cl.
*H04M 3/16* (2006.01)

(52) U.S. Cl.
USPC ............ 455/411; 455/452; 370/331; 709/208

(58) Field of Classification Search
CPC ......... H04W 8/16; H04W 8/24; H04W 12/00; H04W 12/02; H04W 12/06; H04W 12/08; H04W 48/02
USPC ..................... 455/411, 452; 709/208; 370/331
See application file for complete search history.

(56) References Cited

U.S. PATENT DOCUMENTS

| 6,011,910 | A | 1/2000 | Chau et al. |
|---|---|---|---|
| 6,614,809 | B1 | 9/2003 | Verma et al. |
| 7,586,878 | B2 | 9/2009 | Hsu et al. |
| 7,633,918 | B2 | 12/2009 | Zhang |
| 7,652,984 | B1 * | 1/2010 | Kotecha .................. 370/217 |
| 7,685,292 | B1 | 3/2010 | Kinsella et al. |
| 7,751,405 | B1 | 7/2010 | Kompella |
| 8,050,680 | B2 | 11/2011 | Won et al. |
| 2001/0001872 | A1 | 5/2001 | Singh |
| 2009/0245133 | A1 | 10/2009 | Gupta et al. |
| 2010/0299173 | A1 * | 11/2010 | Zampiello et al. ............. 705/8 |
| 2012/0209934 | A1 * | 8/2012 | Smedman .................. 709/208 |
| 2013/0242965 | A1 * | 9/2013 | Horn et al. ................ 370/338 |

FOREIGN PATENT DOCUMENTS

| EP | 1724965 | 9/2009 | |
|---|---|---|---|
| EP | 1695584 | 11/2009 | |
| EP | 2166799 A1 * | 3/2010 | ............ H04W 48/12 |

OTHER PUBLICATIONS

"Proposal for Native-GAS Query for NAI Realm List" by Gabor Bajko and Dave Stephenson, IEEE Wireless LANs dated Jul. 14, 2008.

(Continued)

*Primary Examiner* — Amancio Gonzalez
(74) *Attorney, Agent, or Firm* — Brian M. Mancini

(57) ABSTRACT

An on-demand access tunnel to a service provider is provided for a mobile device that first receives information about supported service providers from a wireless communication network entity. The mobile device can select a supported service provider and start an association process to communicate with the selected service provider. The network entity determines the selected service provider and sets up a tunnel connection from an access point of the wireless communication network to the selected service provider. The tunnel connection is torn down when the mobile device dissociates from the access point and no other device is connected to the service provider network using the tunnel connection.

18 Claims, 3 Drawing Sheets

(56) References Cited

OTHER PUBLICATIONS

"The Future of Hotspots: Making Wi-Fi as Secure and Easy to Use as Cellular" Cisco Public Information copyright 2012.
International Search Report and Written Opinion for International Patent Application No. PCT/US2013/047882 mailed Jun. 26, 2013.
Lan/Man Standards Committee of the IEEE Computer Society: IEEE 802.11u-2011 Part 11: Wireless LAN Medium Access Control (MAC) and Physical Layer (PHy) Specifications—Amendment 9: Interworking with External Networks, Feb. 25, 2011, pp. 1-208, XP055032050, Retrieved from the Internet: URL:http://standards.ieee.org/getieee802/download/802.11u-2011.pdf [retrieved on Jul. 6, 2012] l'iho 1 e document in particular sections 5 and 11.23; figures 5-6a.

* cited by examiner

ON-DEMAND ACCESS TUNNEL BETWEEN SERVICE PROVIDER NETWORK AND WIRELESS COMMUNICATION NETWORK

FIELD OF THE DISCLOSURE

The present invention relates generally to network access for a wireless communication network, and more particularly to an on-demand access tunnel between a service provider network and a wireless communication network.

BACKGROUND

As per the recently defined IEEE 802.11u standard, an access point vendor is required to establish a tunnel supporting Layer 2 (L2) tunneling protocols with a service provider to provide connection service to mobile phone users. Further, the IEEE 802.11u standard allows an access point (AP) of a wireless local area network (WLAN) to support mobile phone communications with multiple service provider networks. The number of L2 tunnels that needs to be established is directly proportional to the number of service providers supported by the AP. The more service providers supported, the greater the number of tunnels that need to be established.

In particular, a Layer-2 Tunneling Protocol—Version 3 (L2tpv3) protocol establishes L2 tunnels that are always in upward direction from the AP towards the service providers. The number of tunnels is proportional to the number of service providers supported by the AP, and these tunnels are established even if they are not used. However, the presence of these L2 tunnels, even when it's not necessary, creates unnecessary overhead and loading since these tunnels need protection with IPsec for data integrity and encryption, which is processor intensive for a service provider concentrator, the AP, and any intermediate hub provider.

Hence, there is a need of a system and method in which L2 tunnels are set up or established dynamically between a WLAN and service providers, only when there is a need to do so. It would also be of benefit if these tunnels can be torn down when not being used.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
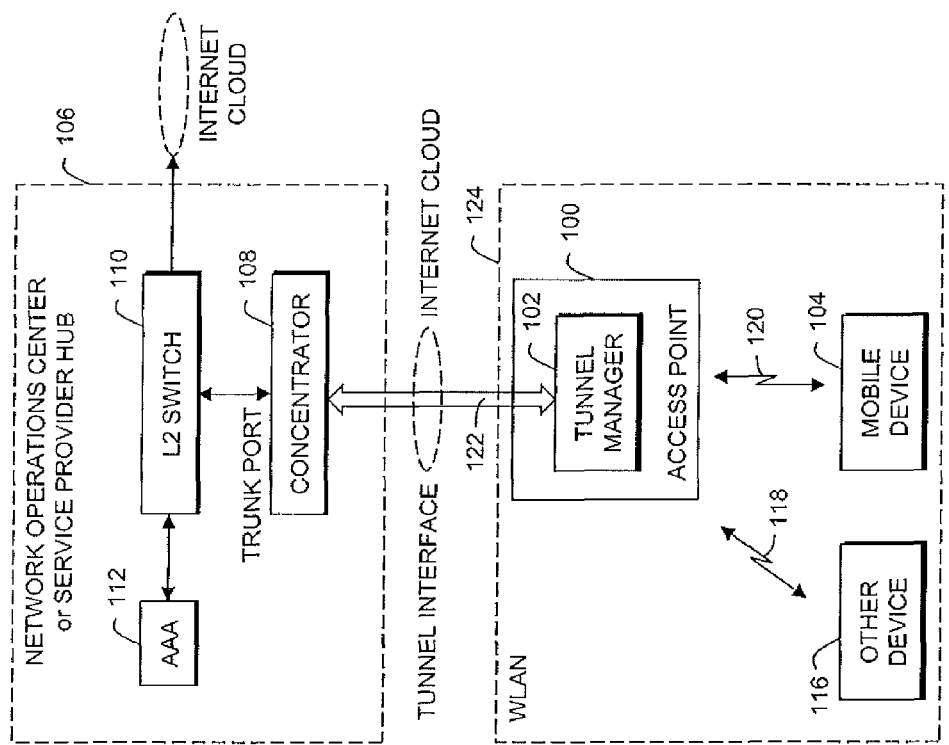
FIG. 1 is a simplified block diagram of a tunneling system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a system and method in which Layer 2 tunnels are set up or established dynamically, only when there is a need to do so. The present invention also provides for these tunnels to be torn down when not being used. In particular, the present invention provides a tunnel between a wireless local area network (WLAN) and a service provider network, wherein this tunnel is only established as needed by a mobile device, i.e. on-demand. The tunnel is configured by an access point (AP), WLAN switch, or other WLAN network entity. The presence of the tunnel allows the mobile phone to offload some or all of its data services through the WLAN to suitable networks. Such suitable networks are discovered through the advertisement of available access networks to a mobile phone before the phone associates with the WLAN and is authenticated to the network.

In operation, a mobile device will select a service provider supported by the AP. This can be accomplished using at least two scenarios:

In one embodiment, a mobile device can receive an IEEE 802.11u beacon from the AP. The beacon includes a list of identifiers of supported service providers (SSPs), such as organization identifiers (OIs) and/or network access identifier (NAI) realm access network query protocol elements (ANQP-elements) where a single basic service set identifier (BSSID) can support multiple SSPs. The mobile device then checks if it has credentials to authenticate with an identified SSP. If it has configured credentials to authenticate for an SSP, the mobile device will initiate its association process with the selected SSP. If the listed SSPs in the beacon do not match with any of the SSPs configured in the mobile device, the mobile device can initiate a communication by sending an access network query using an access network query protocol (ANQP) transported by generic advertisement service (GAS) public action frames for fetching more SSPs. The AP can intercept this access network query and, in response thereto, transmit a further list of supporting SSP identifiers. The mobile device will then select a particular SSP from the list based on policies of the mobile phone service and the application providers and will start the association process.

In another embodiment, with/or without IEEE 802.11u support, each individual BSSID can be configured for one SSP. Therefore, an AP can advertise multiple BSSIDs it supports, each corresponding to a known SSP. The mobile device can then select and associate with one of those BSSID/SSPs based on policies of the mobile phone service and the application providers. In this case, the AP not to intercept the mobile device's request for establishing the tunnel since it already knows the SSP for that selected BSSID, and that it needs to establish a tunnel with the corresponding SSP. It should be noted that if any other device associates to the AP with the same SSP support, the AP need not establish a new tunnel.

Once associated, the mobile device will send an authentication message to the selected SSP, which the AP can intercept to determine the selected SSP, unless the SSP is already known wherein the AP need not intercept the authentication message. Once the AP has determined the selected SSP identity, the AP sets up an L2tpv3 tunnel dynamically to the respective selected SSP. The authentication message(s) can access a home Authentication, Authorization, and Accounting (AAA) server 112 of the mobile device via this selected SSP in order for the WLAN to authenticate the mobile device. It should be noted that if any other device associates to the AP with the same SSP support, the AP need not establish a new tunnel.

Therefore, in accordance with the present invention, L2tpv3 tunnels are established only in response to an association/authentication process by the mobile device. And, when the mobile unit dissociates form the AP, and no other mobile unit is using the service provider network over that tunnel, the AP tears down the L2tpv3 tunnel. In other words, a tunnel established by an AP is torn down when the last mobile unit using the service provider over that tunnel disconnects from the AP, thereby freeing up, not only AP and WLAN resources, but also service provider concentrator resources and any intermediate hub or proxy resources.

In operation, an access point or other WLAN entity responds to a wireless mobile that is seeking a remote, service provider network to extend an end-to-end wireless connection from the wireless mobile to that service provider network. As described herein, the mobile device includes any device configured with a wireless local area network (WLAN) interface operable to transmit and receive data over the WLAN including, but not limited to, a wide variety of consumer electronic platforms such as mobile stations, mobile units, mobile nodes, user equipment, user devices, mobile devices, remote unit platforms, subscriber equipment, subscriber stations, access terminals, remote terminals, terminal equipment, gaming devices, music devices, laptop computers, desktop computers, tablets, netbooks, printers, scanners, smart phones, cellular phones, personal digital assistants, and the like, all referred to herein as mobile devices.

In an exemplary embodiment, such as shown in FIG. 1, the present invention utilizes Internet, IEEE 802.11, and associated protocols, but the present invention can be utilized with other protocols. Wireless Local Area Networks (WLANs) are generally defined in IEEE 802.11 standards and can operate over the unregulated 2.4 and 5 GHz frequency bands spectrum. However, it should be recognized that the present invention is also applicable to a communication system operable in a network that may be based on different wired or wireless technologies. For example, the description that follows can apply to an access network that is IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the mobile device and access point are preferably compliant with at least the IEEE 802.11 specification.

Those skilled in the art will recognize that FIG. 1 does not depict all of the equipment necessary for system to operate but only those system components and logical entities particularly relevant to the description of embodiments herein. For example, an access point, eNodeB, or base station can be connected with or comprise one or more devices such as WLAN stations (which include access nodes, Media Access Controllers, AP controllers (and/or switches), base transceiver stations, base site controllers, packet control functions, packet control units, and/or radio network controllers. However, all of these other devices are not shown specifically. The devices of the system can communicate with either other with a wireless or wired (e.g. Ethernet) connections. Such communication can be a direct communication or a communication relayed through a higher level network entity such as a switch, controller, resource manager, and the like.

Each of the devices shown in FIG. 1 are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic. Therefore, each WLAN network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the tunnel configuration aspect of the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option.

It is envisioned that the present invention utilizes existing wireless security protocols and other security mechanisms between the mobile device and the remote, service provider network. For example, the wireless mobile can utilize IEEE 802.11i (Wi-Fi Protected Access—WPA and WPA2), AES encryption, extensible authentication protocol (EAP), and IEEE 802.1x, Wired Equivalent Privacy (WEP), etc. authentication to communicate with its home network or service provider network. Specifically, the tunnel connection enables whatever wireless security is utilized by the mobile to be extended to the service provider. This can include encapsulating the wireless security over another protocol, e.g. wired protocols such as IPsec, and the like to the service provider. The AP can create other secure tunnels such as with point-to-point tunneling protocol (PPTP), layer 2 tunneling protocol (L2TP), Internet Protocol Security (IPsec), Secure Sockets Layer (SSL)/Transport Layer Security (TLS), and the like.

The present invention utilizes the following IEEE 802.11u defined terms:

Additional Step Required for Access (ASRA) that is provided in a beacon of the AP. ASRA is set to 1 by the AP to indicate that the network requires a further step for access. In effect, ASRA is an indication that a network access identifier realm selection is required from the mobile device. If ASRA is set to 0, the WLAN does not support IEEE 802.11u, and access is provider as is already known in the art.

Generic Advertisement Service (GAS) provides for Layer 2 transport of an advertisement protocol's frames between the mobile device and a server in a network prior to authentication. The access point is responsible for the relay of a mobile device's query to a server in the service provider network and for delivering any response back to the mobile device.

Access Network Query Protocol (ANQP) is a query and response protocol used by a mobile device to discover various information, including identifications of service providers accessible by the access point along with access support information to be used by the mobile device to select a service provider.

Network Access Identifier (NAI) realms are used for, among other purposes, routing authentication transactions to a mobile device's home realm. The NAI also identifies the endpoint of a tunnel to be opened. Although the home realm can appear in the realm portion of the NAI, a different realm can be used in cases where the home realm is reachable only via another intermediate realm. The mobile device can only use a different realm than the home realm when the mobile device knows that the other realm is available and supports such usage. The mobile may determine these conditions through a local database that associates realms with particular service provider networks. A list of NAI realms can be provided corresponding to service providers networks that are accessible by an access point AP and any intermediate networks needed to reach those service providers networks. This list can be returned in response to the GAS Query.

Referring to FIG. 1, a system architecture is illustrated with an access point (AP) 100 or other network entity of a wireless local area network (WLAN) that provides a mobile device 104 on-demand access to a service provider network 106 according to an exemplary embodiment of the present invention. The WLAN can include other entities (not shown) as are known in the art to provide wireless connectivity to multiple wireless mobiles using at least one access point. The AP 100 is an exemplary wireless network infrastructure product as described herein. The AP can provide multiple tunnel connections, each to a different service provider.

The AP 100 or network entity includes a tunnel manager 102 operable to establish an end-to-end tunnel connection 122 for the mobile device 104 from the AP to the service provider network 106. The tunnel to the service provider network 106 connects to a concentrator 108 of either a network operations center or a service provider hub. It is envisioned that the AP is operable to establish and manage multiple tunnels. The concentrator 108 is provided specifically to handle a large number of incoming tunnels for different mobile devices. For each tunnel a mobile is considered a virtual member of the connected network and generally can access the network as if locally connected, i.e. applications can run without any awareness that the mobile device is outside the network. In particular, each tunnel goes to a separate virtual local area network (VLAN) on a network switch 110 on a trunk port carrying the tunneled VLANs, where each VLAN is tied to a different service provider network 106. In particular, each VLAN has L2tpv3 pseudo-wires to a Network Operation Center extending a Layer 2 VLAN over a routed Layer 3 network, where the VLAN extends beyond both ends of the tunnel, between the access point and the service provider.

In practice, the present invention is used by a mobile device 104 for authentication and to provide a VLAN connection with a service provider network 106. The mobile device may or may not be IEEE 802.11u-capable. As the mobile device 104 roams it can come within range of a WLAN 124, where it is able to receive beacons from at least one AP of the WLAN.

In one embodiment, the beacons can indicate support for the IEEE 802.11u protocol by providing an information element (ASRA, internetworking element, etc.) within each beacon. The beacon also includes a basic service set identifier (BSSID) identifying the particular WLAN of the signaling AP. The beacon can support multiple service providers (SSPs) and includes a list of identifiers of SSPs, such as organization identifiers (OIs) and/or network access identifier (NAI) realm access network query protocol elements (ANQP-elements). An IEEE 802.11u-capable mobile device will have a local database in memory containing credentials used to authenticate with SSPs. This mobile device will check if it has credentials to authenticate with an identified SSP in the list. If the mobile device has configured credentials to authenticate for a listed SSP, the mobile device will initiate its association process with a selected SSP based on policies of the mobile phone service and the application providers. If the listed SSPs in the beacon do not match with any of the SSPs configured in the mobile device, the mobile device can initiate communication by using generic advertisement service (GAS) public action frames to send an access network query protocol (ANQP) query to fetch more SSPs. The AP can intercept this query and, in response, transmit a further list of supported SSP identifiers. The mobile device will then select a particular SSP from the list based on policies of the mobile phone service and application providers stored in the local database, and will start the association process with the selected BSSID/SSP. Once associated with the AP, the mobile device will send an authentication message to the selected SSP, which the AP can intercept to determine the selected SSP. Once the AP has determined the selected SSP identity, the AP can then check if a tunnel already exists for the selected SSP, and if not, a tunnel manager 102 sets up a tunnel connection 122, based on the SSP identity selected by the mobile device, from the access point 100 or other WLAN entity to the selected SSP 106, and specifically to a concentrator 108 and further Layer 2 switch 110 for the SSP 106, using a Layer-2 Tunneling Protocol—Version 3 (L2tpv3).

In another embodiment, with/or without IEEE 802.11u support, each AP can advertise multiple BSSIDs that it supports, each corresponding to a known SSP. The mobile device then selects a particular BSSID/SSP based on policies of the mobile phone service and application providers stored in the local database. The mobile device can then associate with the selected BSSID/SSP. In this case, the AP already knows the SSP for that selected BSSID from a static configuration, i.e. a mapping between the BSSID and SSP identifier, and need not intercept a mobile devices authentication messaging for establishing a tunnel. The AP can then check if a tunnel already exists for the selected SSP, and if not, a tunnel manager sets up a tunnel connection 122, based on the SSP identity selected by the mobile device, from the access point 100 or other WLAN entity to the selected SSP 106, and specifically to a concentrator 108 and further Layer 2 switch 110 for the SSP 106, using a statically configured Layer-2 Tunneling Protocol—Version 3 (L2tpv3).

Specifically, in either embodiment the L2tpv3 tunnel is initiated via a control connection. In particular, as soon as a new tunnel and its associated sessions are configured, an L2tpv3 signaling module of the tunnel manager 102 will initiate the l2tpv3 signaling which involves sending Start-Control-Connection-Request (SCCRQ) l2tpv3 signaling message towards the concentrator 108. After the concentrator has accepted the control connection, it sends out Start-Control-Connection-Request (SCCRP) L2tpv3 signaling message towards the tunnel manager, which confirms the successful establishment of control connection (l2tpv3 tunnel) and sends out Start-Control-Connection-Connected (SCCN) L2tpv3 signaling message towards the concentrator.

As soon as the control connection (L2tpv3 tunnel) is up, the tunnel manager initiates the L2tpv3 session establishment for the data connection, which involves sending out the Incoming-Call-Request (ICRQ) L2tpv3 signaling message towards the concentrator. After the concentrator has accepted the session, it sends out Incoming-Call-Reply (ICRP) L2tpv3 signaling message towards the tunnel manager, which confirms the successful establishment of L2tpv3 session and sends out Incoming-Call-Connected (ICCN) L2tpv3 signaling message towards the concentrator. A VLAN including the service provider and the mobile device is extended beyond both ends of the tunnel connection, such that the service provider and the mobile device can communicate 120 transparently. The actual VLAN connection between the mobile device 104 and the service provider network 106 can occur through a L2 switch 110 for the service provider network, and optionally a network operations center (NOC) or intermediate service provider hub for the service provider network depending on the NAI realm model chosen by the mobile device based on the mobile phone service/application providers in its local database.

When the mobile device is done communicating 120 with the service provider network 106, it can dissociate from the AP 100 of the WLAN. In accordance with the present invention, the network entity tears down the tunnel connection 122 when the mobile device dissociates from the access point and no other device 116 is connected 118 to the service provider network 106 using the tunnel connection 122. If other devices are connected to the service provider network using the connection, the tunnel manager will wait a predetermined amount of time to check that there are no more devices 116 connected 118 to the service provider network 106 using the tunnel connection 122, whereupon the tunnel connection 122 is torn down.

Figure 2:
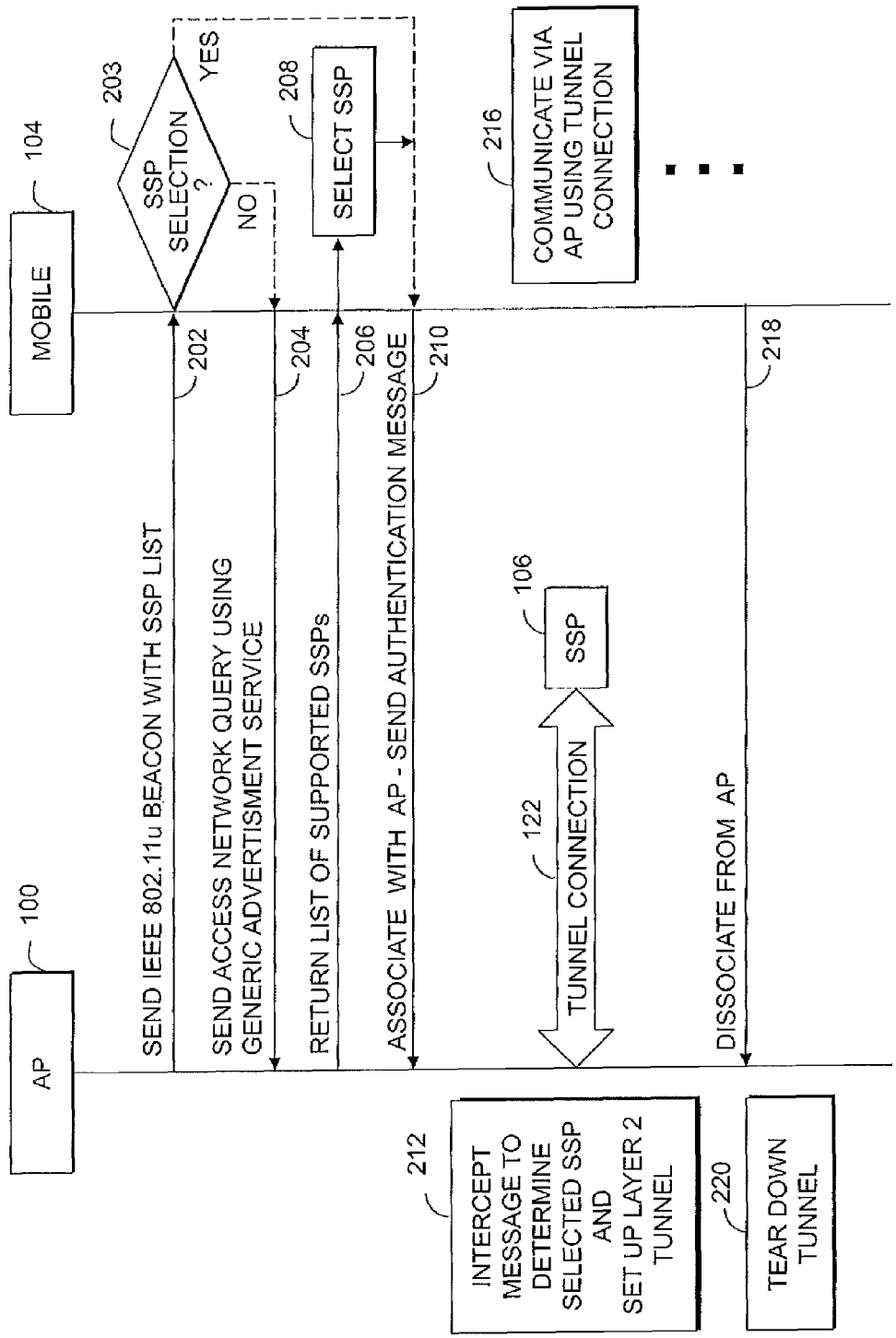
FIG. 2 is a flow diagram of the operation of the system of FIG. 1, in accordance with one embodiment of the present invention.

FIG. 2 presents a flow diagram that illustrates a simplified sequence for providing an on-demand access tunnel between a service provider network and a wireless communication network for a mobile device, according to a first embodiment of the present invention.

In a first step 202, an IEEE 802.11u-capable mobile device receives an IEEE 802.11u beacon from an access point of the wireless local area communication network (WLAN). The beacon includes a list of identifiers of supported service providers (SSPs), such as organization identifiers (OIs) In this first embodiment a single basic service set identifier (BSSID) of the WLAN can support multiple SSPs.

In a next step the mobile device selects a supported service provider. This includes the substeps of 203, the mobile device checking if it has credentials to authenticate with an identified SSP in the list it will select one of the SSPs based on policies of the mobile phone service and the application providers. If the mobile device has configured credentials to authenticate for a listed SSP, the mobile device will select one of the SSPs based on policies of the mobile phone service and the application providers. If the listed SSPs in the beacon do not match with any of the SSPs configured in the mobile device, the mobile device can initiate communication by using generic advertisement service (GAS) public action frames, for example, to send an access network query protocol (ANQP) query 204 to fetch more SSPs. The AP can intercept this query and, in response, transmit 206 a further list of SSP identifiers of roaming partners. The mobile device will then search a local database to compare the SSP identifiers in the further list with its roaming partners to select 208 a particular SSP identifier of a roaming partner from the further list.

In a next step 210, the mobile device will start the association process with the selected BSSID/SSP to communicate with the selected SSP. Once associated with the AP, the mobile device will send an authentication message to the selected SSP.

In a next step 212, the AP can intercept the authentication message to determine the SSP selected by the mobile device. Once the AP has determined the selected SSP identity, the AP can then check if a tunnel already exists for the selected SSP, and if not, set up a tunnel connection 122, based on the SSP identity selected by the mobile device, to the selected SSP 106. In practice, the tunnel connection is made between the access point and a concentrator for the service provider network, and is a Layer-2 Tunneling Protocol—Version 3. In this way, a VLAN can be extended beyond both ends of the tunnel connection, from the mobile device to the service provider network.

In a next step, after the tunnel connection is set up, the mobile device can communicate 216 with the service provider using the tunnel connection via the AP and concentrator/switch. Traffic can flow through a Network Operations Center or intermediate service provider hub depending on the SSP model chosen by the mobile device based on the mobile phone service/application providers in its local database. When the mobile device is done communicating with the service provider, it can dissociate 218 from the WLAN (AP).

In a next step 220, the network entity tears down the tunnel connection when the mobile device dissociates from the access point and no other device is connected to the service provider network using the tunnel connection. If other devices are connected to the service provider network using the tunnel connection, this step includes waiting a predetermined amount of time to check that there are no more devices connected to the service provider network using the tunnel connection, whereupon the tunnel connection is torn down.

Figure 3:
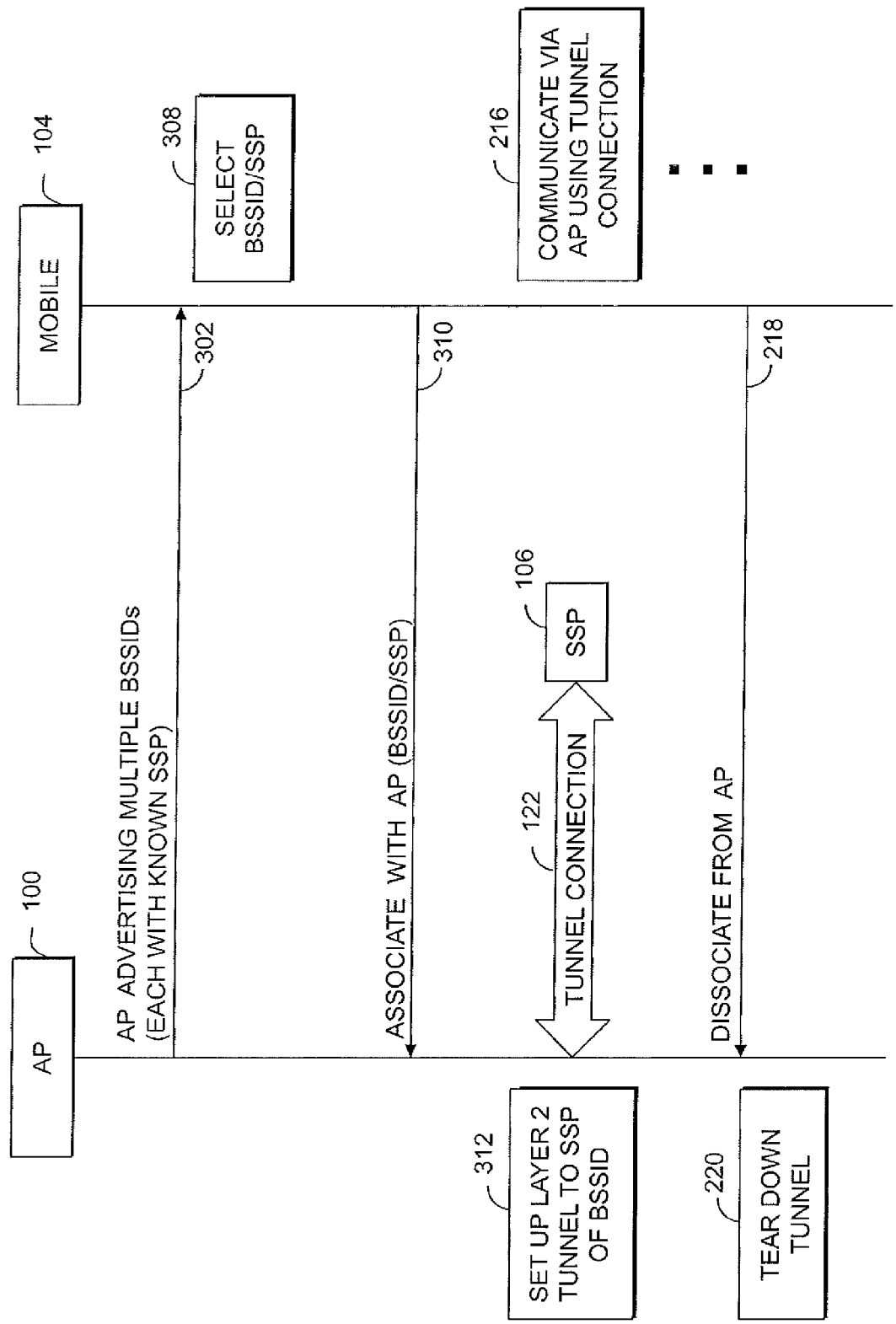
FIG. 3 is a flow diagram of the operation of the system of FIG. 1, in accordance with another embodiment of the present invention.

FIG. 3 presents a flow diagram that illustrates a simplified sequence for providing an on-demand access tunnel between a service provider network and a wireless communication network for a mobile device, according to a second embodiment of the present invention.

In a first step 302, a mobile device receives a beacon from an access point of the wireless local area communication network, where the beacon or mobile device with/without support of IEEE 802.11u protocols. In this embodiment, the beacon advertises multiple BSSIDs that it supports, each corresponding to a known SSP.

In a next step 308, the mobile device, in response to the beacon, searches a local database to compare the received basic service set identifiers with corresponding service provider and selects a particular BSSID/SSP based on policies of the mobile phone service and application providers stored in the local database. This step depends on the client application running on the mobile device. The mobile device can connect to BSSID based on the configured policies.

In a next step 310, the mobile device can then start an association process with the BSSID corresponding to the selected SSP to communicate with the selected SSP. In this case, the AP already knows the SSP for that selected BSSID from a static configuration, i.e. a mapping between the BSSID and SSP identifier, and can establish 312 a tunnel 122 with the corresponding SSP 106. The remaining steps 216-220 are similar to the first embodiment.

Advantageously, the present invention only establishes a tunnel connection to a service provider network in an IEEE 802.11u protocol when a mobile device is requesting association to a WLAN or hotspot for offloading its data. This tunnel connection can then be torn down when the mobile device dissociates from the WLAN. The present invention thereby reduces loading and overhead in the system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing an on-demand access tunnel between a service provider network and a local wireless communication network, comprising:
    in an IEEE 802.11u-capable mobile device, receiving an IEEE 802.11u beacon containing a list of identifiers of multiple supported service providers from a network entity of the local wireless communication network;
    in the mobile device, selecting a supported service provider;
    in the mobile device, starting an association process to communicate with the selected service provider;
    in the local wireless communication network entity, determining the selected service provider by intercepting an authentication message from the mobile device to the selected service provider;
    in the local wireless communication network entity, setting up a tunnel connection from an access point to the determined selected service provider; and
    tearing down the tunnel connection by the local wireless communication network entity when the mobile device dissociates from the access point and no other device is connected to the service provider using the tunnel connection.

2. The method of claim 1, wherein selecting a supported service provider comprises the substeps of:
    in the mobile device checking a local database for credentials to authenticate with an identified selected service provider in the list, and if credentials are found for a listed service provider, selecting that service provider, and otherwise:
    in the mobile device, initiating an access network query;

in the local wireless communication network entity, intercepting the query and responding with a further list of service provider identifiers of roaming partners; and in the mobile device, searching a local database to compare the service provider identifiers in the further list with roaming partners to select a particular roaming partner.

3. The method of claim 2, wherein the access network query uses an access network query protocol transported by generic advertisement service public action frames.

4. The method of claim 2, wherein the identifiers are one or more of organization identifiers (OIs) and network access identifier (NAI) realm access network query protocol elements (ANQP-elements).

5. The method of claim 2, wherein a single basic service set identifier of the wireless communication network can support multiple service providers.

6. The method of claim 1, wherein the receiving step includes receiving the beacon advertising multiple basic service set identifiers from an access point of the local wireless communication network, each basic service set identifier configured for one service provider, and wherein the selecting step includes the mobile device searching a local database to compare the received basic service set identifiers with corresponding service providers to select a particular service provider, and wherein the starting an association step includes the mobile device starting the association process with the selected basic service set identifier corresponding to the selected service provider.

7. The method of claim 6, wherein the determining step includes the network entity determining the selected service provider from the basic service set identifier from a statically configured map.

8. The method of claim 1, wherein the tunnel connection uses Layer-2 Tunneling Protocol-Version 3.

9. The method of claim 1, wherein the tunnel connection is made between the access point and a concentrator for the service provider network.

10. The method of claim 1, wherein the wireless communication network entity is a switch of the wireless communication network.

11. The method of claim 1, wherein the wireless communication network entity is the access point.

12. The method of claim 1, wherein the setting up step includes checking if a tunnel connection already exists for the service provider, and setting up the tunnel connection only if there is no existing tunnel connection for the service provider.

13. The method of claim 1, wherein if other devices are connected to the service provider using the tunnel connection, the tearing down step includes waiting a predetermined amount of time to check that there are no more devices connected to the service provider using the tunnel connection, whereupon the tunnel connection is torn down.

14. The method of claim 1, wherein the selecting step is based on policies of mobile phone service and application providers stored in the local database.

15. A system for providing an on-demand access tunnel between a service provider network and a local wireless communication network, comprising:

an IEEE 802.11u-capable mobile device operable to: receive an IEEE 802.11u beacon containing a list of identifiers of multiple supported service providers from a network entity of the local wireless communication network, select a supported service provider, and start an association process to communicate with the selected service provider; and the local wireless communication network entity operable to: determine the selected service provider by intercepting an authentication message from the mobile device to the selected service provider, set up a tunnel connection from an access point of the local wireless communication network to the determined selected service provider, and tear down the tunnel connection when the mobile device dissociates from the access point and no other device is connected to the service provider using the tunnel connection.

16. The system of claim 15, wherein the mobile device is further operable to check a local database for credentials to authenticate with an identified selected service provider in the list, and if credentials are found for a listed service provider, selected that service provider, and otherwise the mobile device is further operable to: initiate an access network query, wherein the local wireless communication network entity intercepts the query and responds with a further list of service provider identifiers of roaming partners, and search a local database to compare the service provider identifiers in the further list with roaming partners to select a particular roaming partner.

17. The system of claim 15, wherein the beacon advertises multiple basic service set identifiers from an access point of the local wireless communication network, each basic service set identifier configured for one service provider, and wherein the mobile device is further operable to search a local database to compare the received basic service set identifiers with corresponding service providers to select a particular service provider, and wherein the mobile device can start the association process with the selected basic service set identifier corresponding to the selected service provider.

18. The system of claim 15, wherein tearing down the tunnel includes waiting a predetermined amount of time to check that there are no more devices connected to the service provider using the tunnel connection, whereupon the tunnel connection is torn down.

* * * * *